United States Patent
Li et al.

(10) Patent No.: US 10,110,008 B2
(45) Date of Patent: Oct. 23, 2018

(54) MICRO GRID STABILIZATION DEVICE

(71) Applicant: CHUNG-HSIN ELECTRIC & MACHINERY MFG. CORPORATION, Taoyuan (TW)

(72) Inventors: Ting-Kuan Li, Taoyuan (TW); Yen-Haw Chen, Taoyuan (TW); Chun-Der Chang, Taoyuan (TW); Wen-Chieh Wang, Taoyuan (TW); Sung-Feng Tsai, Taoyuan (TW); Jr-Rung Chen, Taoyuan (TW); Su-Ying Lu, Taoyuan (TW)

(73) Assignee: CHUNG-HSIN ELECTRIC & MACHINERY MFG. CORPORATION, Taoyuan (TW)

( * ) Notice: Subject to any disclaimer, the term of this patent is extended or adjusted under 35 U.S.C. 154(b) by 153 days.

(21) Appl. No.: 15/235,022

(22) Filed: Aug. 11, 2016

(65) Prior Publication Data
US 2017/0338657 A1    Nov. 23, 2017

(30) Foreign Application Priority Data
May 17, 2016   (TW) .............................. 105115135 A

(51) Int. Cl.
| | |
|---|---|
| *H02J 3/38* | (2006.01) |
| *H02J 7/00* | (2006.01) |
| *H02M 3/04* | (2006.01) |
| *H02M 7/04* | (2006.01) |
| *H02M 7/44* | (2006.01) |
| *H02J 3/32* | (2006.01) |
| *H02J 4/00* | (2006.01) |
| *H02J 13/00* | (2006.01) |

(52) U.S. Cl.
CPC ................ *H02J 3/382* (2013.01); *H02J 3/32* (2013.01); *H02J 3/383* (2013.01); *H02J 3/386* (2013.01); *H02J 3/387* (2013.01); *H02J 4/00* (2013.01); *H02J 7/0052* (2013.01); *H02J 13/0003* (2013.01); *H02J 13/0006* (2013.01); *H02J 13/0062* (2013.01); *H02J 13/0075* (2013.01); *H02M 3/04* (2013.01); *H02M 7/04* (2013.01); *H02M 7/44* (2013.01); *H02J 2007/0059* (2013.01); *Y02B 10/72* (2013.01)

(58) Field of Classification Search
CPC .......... H02J 3/382; H02J 7/0052; H02J 3/387; H02M 3/04; H02M 7/44
See application file for complete search history.

(56) References Cited

U.S. PATENT DOCUMENTS

| | | | | |
|---|---|---|---|---|
| 7,656,059 | B2 * | 2/2010 | Wang ........................ | H02J 3/04 307/82 |
| 9,077,205 | B2 * | 7/2015 | Teichmann ............. | H02J 3/386 |
| 9,093,845 | B2 * | 7/2015 | Triebel ...................... | H02J 3/32 |

* cited by examiner

*Primary Examiner* — Rexford Barnie
*Assistant Examiner* — Terrence Willoughby

(57) ABSTRACT

A micro grid stabilization device coupled to a DC bus and an AC bus in parallel is provided. A DC power generation apparatus provides power to the DC bus. An AC power generation apparatus provides power to the AC bus. A converter is coupled between the DC bus and the AC bus to transform the voltage of the DC bus and provide the transformed voltage to the AC bus. When the voltage of the DC bus or the AC bus is unstable, the micro grid stabilization device provides power to at least one of the DC bus and the AC bus to stabilize the power of the DC bus and the AC bus.

10 Claims, 3 Drawing Sheets

MICRO GRID STABILIZATION DEVICE

CROSS REFERENCE TO RELATED APPLICATIONS

This Application claims priority of Taiwan Patent Application No. 105115135, filed on May 17, 2016, the entirety of which is incorporated by reference herein.

BACKGROUND OF THE INVENTION

Field of the Invention

The invention relates to a micro grid stabilization device, and more particularly to a device to stabilize power in an alternating current (AC) bus.

Description of the Related Art

At present, power-supply apparatuses are mostly used to provide power to cities, whereas micro grids are utilized to provide power to residents living in remote districts or islands. Additionally, although the number of renewable energy supply apparatuses has gradually increased, power provided by these renewable energy supply apparatuses is unstable; more so than with the micro grid.

BRIEF SUMMARY OF THE INVENTION

In accordance with an embodiment, a micro grid stabilization device comprises a first fuel cell group, a first converter, a first switch, a second converter, a secondary battery, a third converter, a second switch, and a smart energy manager. The first fuel cell group is configured to provide a first voltage. The first converter is coupled to the first fuel cell group and transforms the first voltage to generate a first direct current (DC) voltage. The first switch is coupled to the first converter to output the first DC voltage to a DC bus. A DC power generation apparatus is coupled to the DC bus and provides a second DC voltage to the DC bus. An external inverter is coupled to the DC bus and transforms a voltage of the DC bus to generate a supplementary voltage to an alternating current (AC) bus. The second converter is coupled to the first converter and transforms the first DC voltage or the voltage of the DC bus to generate a first charge voltage. The secondary battery is coupled to the second converter and is charged according to the first charge voltage to provide a second voltage. The third converter is coupled to the secondary battery and transforms the second voltage to generate a first AC voltage. The second switch is coupled to the third converter to output the first AC voltage to the AC bus or to provide the voltage of the AC bus to the third converter. The third converter transforms the voltage of the AC bus to generate a second charge voltage to charge the secondary battery. An AC power generation apparatus is coupled to the AC bus and provides a second AC voltage to the AC bus. The smart energy manager adjusts and controls the operation of at least one of the first fuel cell group, the first converter, the second converter, the third converter, and the secondary battery according to power qualities of the DC bus and the AC bus to stabilize the power of the DC bus and the AC bus.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
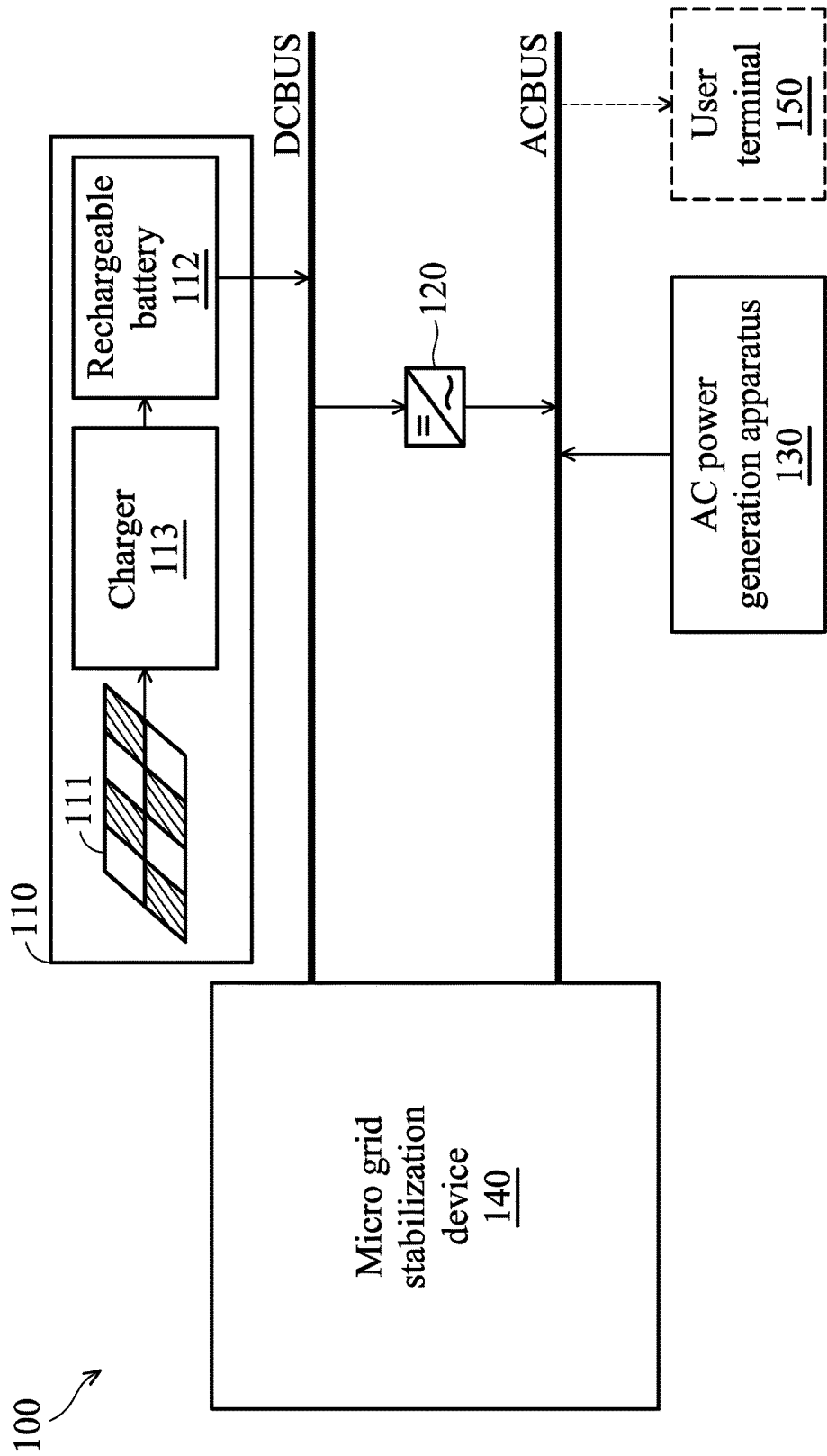
FIG. 1 is a schematic diagram of an exemplary embodiment of a power supply system, according to various aspects of the present disclosure.

FIG. 1 is a schematic diagram of an exemplary embodiment of a power supply system, according to various aspects of the present disclosure. The power supply system 100 comprises a direct current (DC) power generation apparatus 110, an inverter 120, an alternating current (AC) power generation apparatus 130, a micro grid stabilization device 140, a DC bus DCBUS, and an AC bus ACBUS. In this embodiment, the micro grid stabilization device 140 is coupled to the DC bus DCBUS and the AC bus ACBUS to stabilize the power of the DC bus DCBUS and the power of the AC bus ACBUS. In another embodiment, when each of the DC bus DCBUS and the AC bus ACBUS has stable power, a smart energy manager 210 charges a battery, such as the secondary batter 230 shown in FIG. 2, disposed in the smart energy manager 210 according to the power of the DC bus DCBUS or the AC bus ACBUS.

The DC power generation apparatus 110 is coupled to the DC bus DCBUS and the micro grid stabilization device 140 and provides a DC voltage to the DC bus DCBUS. In one embodiment, the DC power generation apparatus 110 is a renewable energy generation apparatus. The invention does not limit the kind of renewable energy generation apparatus. In this embodiment, the renewable energy generation apparatus comprises a photovoltaic plate 111, a rechargeable battery 112, and a charger 113. The photovoltaic plate 111 absorbs sunlight to generate electric energy. The charger 113 transforms the electric energy to charge the rechargeable battery 112. The rechargeable battery 112 provides a DC voltage to the DC bus DCBUS.

The inverter 120 is coupled between the DC bus DCBUS and the AC bus ACBUS. The inverter 120 transforms the voltage of the DC bus DCBUS to generate a supplementary voltage and provides the supplementary voltage to the AC bus ACBUS. In one embodiment, the inverter 120 is a unidirectional inverter which is capable of transforming the voltage of the DC bus DCBUS and provides the transformed voltage to the AC bus ACBUS. In another embodiment, the inverter 120 is a bi-directional inverter which is not only capable of transforming the voltage of the DC bus DCBUS to provide power to the AC bus ACBUS, but is also capable of transforming the voltage of the AC bus ACBUS to provide power to the DC bus DCBUS.

The AC power generation apparatus 130 is coupled to the AC bus ACBUS and the micro grid stabilization device 140, and provides an AC voltage to the AC bus ACBUS. In one embodiment, the AC power generation apparatus 130 is a diesel generator, but the disclosure is not limited thereto. The AC power generation apparatus 130 means a power company. Any apparatus can serve as the AC power generation apparatus 130 as long as the apparatus is capable of generating AC power. Taking the diesel generator for example: since the cost of diesel is high, when the inverter 120 provides the supplementary voltage to the AC bus ACBUS, the cost of power generation by the AC power generation apparatus 130 is reduced.

The micro grid stabilization device 140 is coupled to the DC bus DCBUS and the AC bus ACBUS to stabilize the power of the DC bus DCBUS and the AC bus ACBUS. In this embodiment, the micro grid stabilization device 140 detects the voltages on the DC bus DCBUS and the AC bus ACBUS and provides suitable voltages to the DC bus DCBUS and the AC bus ACBUS according to the detection result. In other embodiments, the micro grid stabilization device 140 captures the voltage of at least one of the DC bus DCBUS and the AC bus ACBUS to charge a battery disposed in the micro grid stabilization device 140.

When the micro grid stabilization device 140 is coupled to various power generation apparatuses in parallel, the cost of power generation of each power generation apparatus is reduced. Therefore, the economic efficiency of the power supply system is increased. The power quality of the power generation apparatus can be maintained to avoid the output power of the power generation apparatus (e.g. 110 or 130) getting so high or so low that the operation of a load is abnormal or the lift of the load is reduced. Furthermore, since the micro grid stabilization device 140 stabilizes the power of the DC bus DCBUS and the AC bus ACBUS, the power reliability of the power generation apparatus is increased.

The micro grid stabilization device 140 is also capable of connecting to a village micro grid, a diesel micro grid, or an urban micro grid. The power provided by a renewable energy generation apparatus may be increased or reduced due to a change of season or weather. However, the micro grid stabilization device 140 can stabilize the power of the renewable energy generation apparatus.

Figure 2:
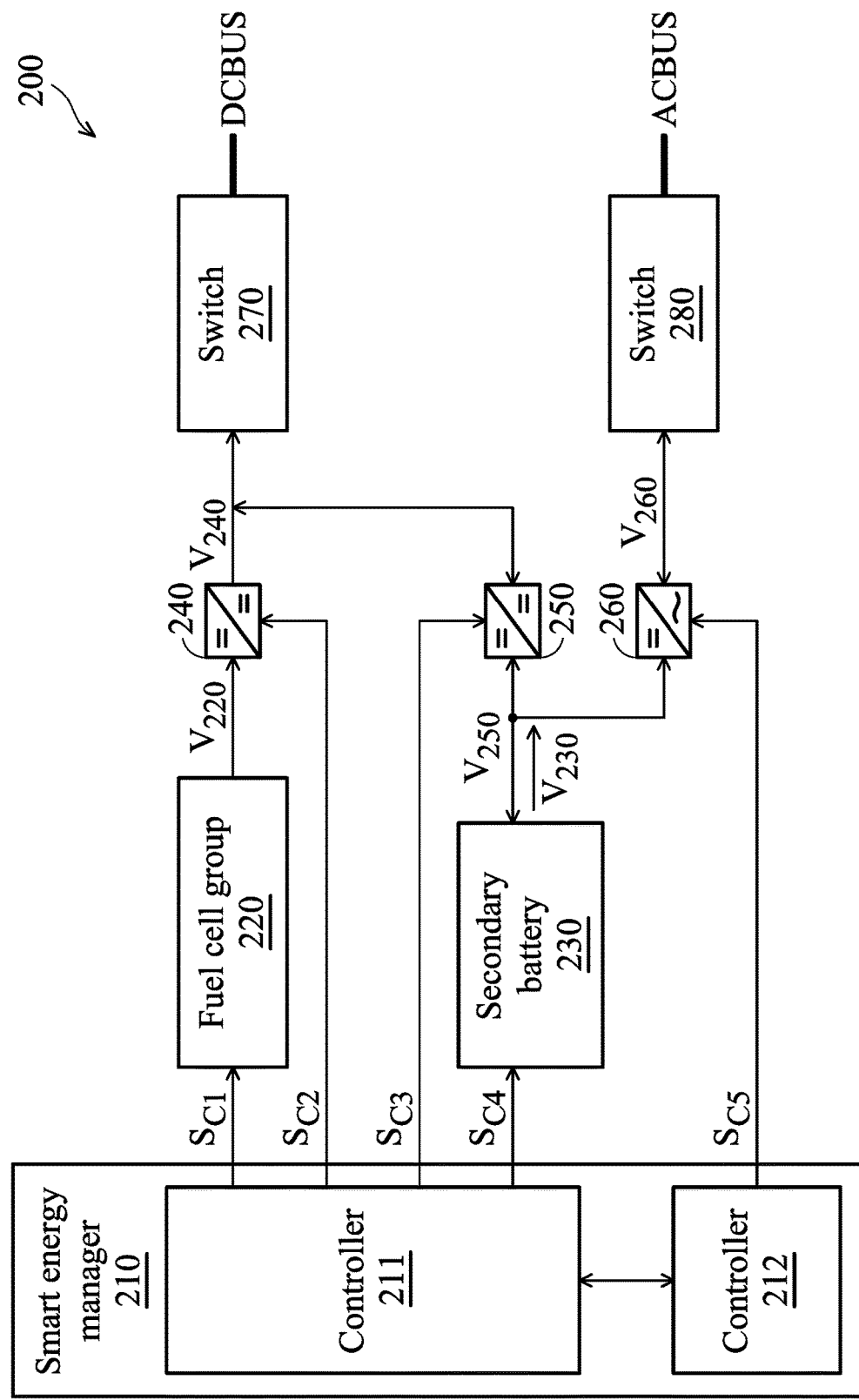
FIG. 2 is a schematic diagram of an exemplary embodiment of a micro grid stabilization device, according to various aspects of the present disclosure.

FIG. 2 is a schematic diagram of an exemplary embodiment of a micro grid stabilization device, according to various aspects of the present disclosure. The micro grid stabilization device 200 comprises a smart energy manager 210, a fuel cell group 220, a secondary battery 230, converters 240, 250, 260, and switches 270 and 280. The fuel cell group 220 is configured to provide a voltage $V_{220}$. In one embodiment, the fuel cell group 220 adjusts the voltage $V_{220}$ according to a control signal $S_{C1}$.

The converter 240 is coupled to the fuel cell group 220 and transforms the level of the voltage $V_{220}$ to generate a DC voltage $V_{240}$. In this embodiment, the converter 240 determines the level of the DC voltage $V_{240}$ according to the control signal $S_{C2}$. In one embodiment, the converter 240 is a DC-DC converter. In some embodiments, the converter 240 may increase or reduce the level of the voltage $V_{240}$. In other embodiments, the converter 240 does not adjust the voltage $V_{240}$ according to a control signal $S_{C2}$.

The switch 270 is coupled to the converter 240 to output the DC voltage $V_{240}$ to the DC bus DCBUS. In another embodiment, when the switch 270 is turned on, the switch 270 directly provides the voltage of the DC bus DCBUS to the converter 250. In one embodiment, the smart energy manager 210 generates a control signal (not shown) to turn the switch 270 on or off. The switch 270 may be a static switch to isolate the micro grid stabilization device 200 and the DC bus DCBUS to avoid the micro grid stabilization device 200 being interfered with by the voltage of the DC bus DCBUS.

The converter 250 is coupled to the converter 240 and transforms the DC voltage $V_{240}$ to generate a charge voltage $V_{250}$. In one embodiment, when the voltage $V_{220}$ provided by the fuel cell group 220 is sufficient to drive the DC bus DCBUS, the smart energy manager 210 turns on the switch 270 to provide the DC voltage $V_{240}$ to the DC bus DCBUS. At this time, the converter 250 transforms the DC voltage $V_{240}$ to generate the charge voltage $V_{250}$ to charge the secondary battery 230. In another embodiment, when there is enough renewable energy, the voltage of the DC bus DCBUS is higher than a predetermined value. Therefore, the smart energy manager 210 turns on the switch 270 and utilizes the converter 250 to transform the voltage of the DC bus DCBUS to charge the secondary battery 230. In other embodiments, when the renewable energy is insufficient to drive the DC bus DCBUS, the smart energy manager 210 controls at least one of the fuel cell group 220 and the secondary battery 230 such that the fuel cell group 220 or the secondary battery 230 provides power to the DC bus DCBUS to stabilize the power of the DC bus DCBUS. In this case, the converter 250 may transform the voltage of the secondary battery 230 and provide the transformed voltage to the DC bus DCBUS via the switch 270. In one embodiment, the converter 250 is a bi-directional converter.

The secondary battery 230 is coupled to the converter 250 and charged according to the charge voltage $V_{250}$. In one embodiment, the secondary battery 230 is a high-voltage storage element. The voltage stored in the secondary battery 230 may reach 380V. The invention does not limit the kind of secondary battery 230. In some embodiments, the secondary battery 230 is a lithium battery. In one embodiment, the smart energy manager 210 monitors the operational status (e.g. voltage, current, and temperature) of the secondary battery 230 to generate a monitored result. The smart energy manager 210 controls at least one of the converters 240, 250, and 260 according to the monitored result to charge the secondary battery 230.

The converter 260 is coupled to the secondary battery 230 and transforms the voltage $V_{230}$ to generate an AC voltage $V_{260}$. In one embodiment, the converter 260 is a bi-directional inverter. The switch 280 is coupled to the converter 260 to output the AC voltage $V_{260}$ to the AC bus ACBUS. In another embodiment, when the power of the AC bus ACBUS is stable, the smart energy manager 210 may turn on the switch 280 to provide the voltage of the AC bus ACBUS to the converter 260. The converter 260 transforms the voltage of the AC bus ACBUS to generate a transformed voltage and then provides the transformed voltage to the secondary battery 230 to charge the secondary battery 230. In this embodiment, the converter 260 is a bi-directional inverter.

The smart energy manager 210 adjusts and controls the operational status of at least one of the fuel cell group 220, the converters 240, 250, and 260, and the secondary battery 230 according to the power qualities of the DC bus DCBUS and the AC bus ACBUS to stabilize the power of the DC bus DCBUS and the AC bus ACBUS.

In one embodiment, the smart energy manager 210 determines the operation of the secondary battery 230 according to the voltage of the DC bus DCBUS (i.e. the power generation of the DC power generation apparatus 110). For example, when the voltage of the DC bus DCBUS is higher than a predetermined value, the smart energy manager 210 controls the converter 250 to transform the voltage of the DC bus DCBUS to charge the secondary battery 230. However, when the voltage of the DC bus DCBUS is lower than the predetermined value, the smart energy manager 210 controls the converter 250 to transform the voltage of the secondary battery 230 and provides power to the DC bus DCBUS via the switch 270 to stabilize the power of the DC bus DCBUS. In other embodiments, the smart energy manager 210 adjusts the voltage of the fuel cell group 220 according to the voltage of the DC bus DCBUS.

Since the voltage of the AC bus ACBUS is affected by the voltage of the DC bus DCBUS, when the voltage of the DC bus DCBUS is unstable, the voltage of the AC bus ACBUS is interfered with by the voltage of the DC bus DCBUS. In one embodiment, when the voltage of the DC bus DCBUS is less than a predetermined value, it means that the DC power generation apparatus 110 is unstable. Therefore, the smart energy manager 210 activates the converter 260. The converter 260 transforms the voltage $V_{230}$ of the secondary battery 230 to generate the AC voltage $V_{260}$ and then provides the transformed voltage to the AC bus ACBUS via the switch 280 to stabilize the power of the AC bus ACBUS.

In some embodiments, the smart energy manager 210 utilizes a wire communication protocol or a wireless communication protocol to collect and record the power qualities of the DC bus DCBUS and the AC bus ACBUS. The smart energy manager 210 adjusts and controls the operational status of at least one of the fuel cell group 220, the converters 240, 250, and 260, and the secondary battery 230 according to the recorded result.

For example, when the smart energy manager 210 recognizes that the voltage of the DC bus DCBUS is unstable, the smart energy manager 210 may provide power to the DC bus DCBUS according to the voltage of at least one of the fuel cell group 220 and the secondary battery 230 to maintain the level of the voltage of the DC bus DCBUS. In another embodiment, the smart energy manager 210 utilizes the voltage of at least one of the fuel cell group 220 and the secondary battery 230 to provide power to the AC bus ACBUS to maintain the level of the voltage of the AC bus ACBUS. However, when the voltage of the DC bus DCBUS is stable, the smart energy manager 210 may utilize the voltage of the DC bus DCBUS to charge the secondary battery 230.

In other embodiments, the AC bus ACBUS is coupled to at least one user terminal 150. In this case, the smart energy manager 210 adjusts and controls the operational status of at least one of the fuel cell group 220, the converters 240, 250, and 260, and the secondary battery 230 according to the electricity consumption of the user terminal 150. For example, when the user terminal 150 needs a high voltage, the smart energy manager 210 utilizes the voltage of at least one of the fuel cell group 220 and the secondary battery 230 to provide power to at least one of the DC bus DCBUS and the AC bus ACBUS to stabilize the level of the voltage of the AC bus ACBUS.

The invention does not limit the internal structure of smart energy manager 210. Any circuit can serve as the smart energy manager 210 as long as the circuit is capable of generating the control signals $S_{C1}$~$S_{C5}$ according to the power qualities of the DC bus DCBUS and the AC bus ACBUS. In this embodiment, the smart energy manager 210 comprises controllers 211 and 212. The controller 211 is a main controller communicating with the controller 212. The controller 211 detects the voltages of the DC bus DCBUS and the AC bus ACBUS and generates the control signals $S_{C1}$~$S_{C4}$ according to the detection result to control the controller 212 such that the controller 212 generates the control signal $S_{C5}$. In other embodiments, different control signals are generated by different controllers. However, one of the controllers serves as the main controller to control the operation of the other controllers.

Figure 3:
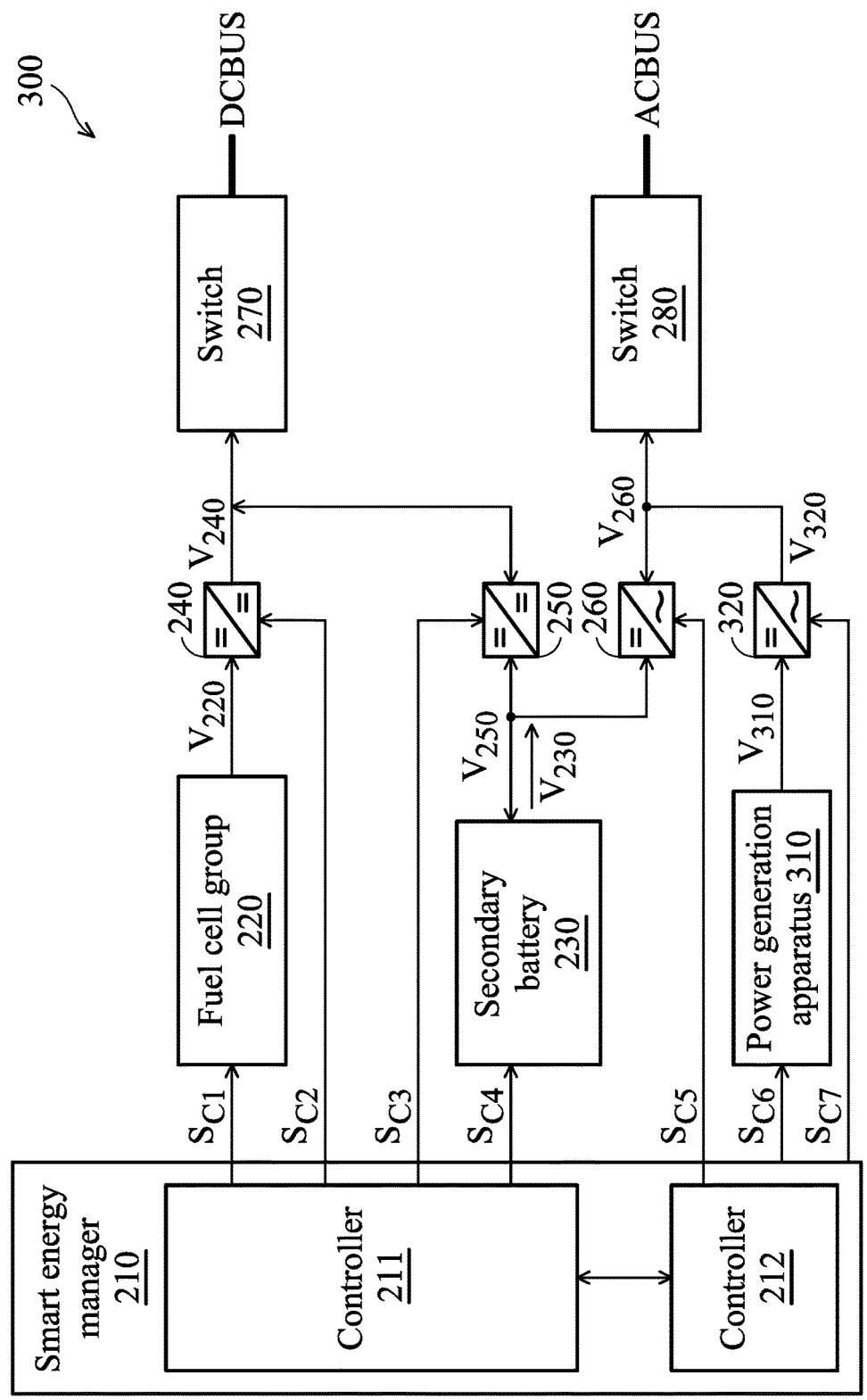
FIG. 3 is a schematic diagram of another exemplary embodiment of the micro grid stabilization device, according to various aspects of the present disclosure.

FIG. 3 is a schematic diagram of another exemplary embodiment of the micro grid stabilization device, according to various aspects of the present disclosure. FIG. 3 is similar to FIG. 2 with the exception that the micro grid stabilization device 300 further comprises a power generation apparatus 310 and a converter 320. The power generation apparatus 310 provides a voltage $V_{310}$. In one embodiment, the power generation apparatus 310 is a fuel cell group, but the disclosure is not limited thereto. In other embodiments, the power generation apparatus is a renewable energy apparatus, such as a wind power generator or a hydroelectric generator.

The converter 320 is coupled to the power generation apparatus 310 and transforms the voltage $V_{310}$ to generate an AC voltage $V_{320}$ to the switch 280. In this embodiment, the switch 280 provides the AC voltage $V_{320}$ to the AC bus ACBUS to stabilize the power of the AC bus ACBUS. In another embodiment, the converter 260 transforms the AC voltage $V_{320}$ and provides the transformed voltage to the secondary battery 230 to charge the secondary battery 230.

The smart energy manager 210 generates the control signals $S_{C6}$ and $S_{C7}$ according to the power qualities of the DC bus DCBUS and the AC bus ACBUS to adjust and control the operational status of the power generation apparatus 310 and the converter 320. For example, the power generation apparatus 310 adjusts the voltage $V_{310}$ according to the control signal $S_{C6}$. Similarly, the converter 320 adjusts the voltage $V_{320}$ according to the control signal $S_{C7}$ and provides the adjusted voltage to the switch 280.

When the voltage on the DC bus DCBUS is unstable, the voltage on the AC bus ACBUS is interfered with by the unstable voltage on the DC bus DCBUS, so the smart energy manager 210 controls at least one of the fuel cell group 220, the secondary battery 230, the power generation apparatus 310, and the converters 240, 250, 260, and 320 to provide power to the DC bus DCBUS to stabilize the power of the DC bus DCBUS or provide power to the AC bus ACBUS to stabilize the power of the AC bus ACBUS.

Furthermore, when the voltage of the DC bus DCBUS exceeds a predetermined value, the converter 250 transforms the voltage of the DC bus DCBUS to charge the secondary battery 230 so that the level of the voltage of the secondary battery 230 is maintained above a predetermined level. When the voltage of the AC bus ACBUS is unstable, the converter 260 provides power to the AC bus ACBUS according to the voltage of the secondary battery 230 to stabilize the voltage of the AC bus ACBUS.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A micro grid stabilization device comprising:
   a first fuel cell group configured to provide a first voltage;
   a first converter coupled to the first fuel cell group and transforming the first voltage to generate a first direct current (DC) voltage;
   a first switch coupled to the first converter to output the first DC voltage to a DC bus, wherein a DC power generation apparatus is coupled to the DC bus and provides a second DC voltage to the DC bus, and wherein an external inverter is coupled to the DC bus and transforms a voltage of the DC bus to generate a supplementary voltage to an alternating current (AC) bus;
   a second converter coupled to the first converter and transforming the first DC voltage or the voltage of the DC bus to generate a first charge voltage;
   a secondary battery coupled to the second converter and charged according to the first charge voltage to provide a second voltage;
   a third converter coupled to the secondary battery and transforming the second voltage to generate a first AC voltage;
   a second switch coupled to the third converter to output the first AC voltage to the AC AC bus or provide a voltage of the AC bus to the third converter, wherein the third converter transforms the voltage of the AC bus to generate a second charge voltage to charge the secondary battery, and wherein an AC power generation apparatus is coupled to the AC bus and provides a second AC voltage to the AC bus; and
   a smart energy manager adjusting and controlling operation of at least one of the first fuel cell group, the first converter, the second converter, the third converter, and the secondary battery according to power qualities of the DC bus and the AC bus to stabilize the power of the DC bus and the AC bus,
   wherein the first switch transmits the voltage of the DC bus to the second converter, and the second converter is a DC-DC converter.

2. The micro grid stabilization device as claimed in claim 1, wherein the DC power generation apparatus is a renewable energy generation apparatus.

3. The micro grid stabilization device as claimed in claim 1, wherein the smart energy manager turns on the first switch according to a status of power generation of the DC power generation apparatus such that the first switch transmits the second DC voltage to the second converter, and wherein the second converter transforms the second DC voltage to charge the secondary battery.

4. The micro grid stabilization device as claimed in claim 1, wherein when the second DC voltage is less than a predetermined value, the smart energy manager turns on the second switch to output the first AC voltage to the AC bus.

5. The micro grid stabilization device as claimed in claim 1, wherein the AC power generation apparatus is a diesel generator.

6. The micro grid stabilization device as claimed in claim 1, further comprising:
   a power generation apparatus configured to provide a third voltage; and
   a fourth converter coupled to the power generation apparatus and transforming the third voltage to generate a third AC voltage to the second switch, wherein the smart energy manager adjusts and controls the operations of the power generation apparatus and the fourth converter according to the power qualities of the DC bus and the AC bus.

7. The micro grid stabilization device as claimed in claim 6, wherein the power generation apparatus is a second fuel cell group.

8. The micro grid stabilization device as claimed in claim 6, wherein the power generation apparatus is a wind power generator or a hydroelectric generator.

9. The micro grid stabilization device as claimed in claim 1, wherein the AC bus is coupled to at least one user terminal, and wherein the smart energy manager adjusts and controls the operation of at least one of the first fuel cell group, the first converter, the second converter, the third converter, and the secondary battery according to an electricity consumption of the user terminal.

10. The micro grid stabilization device as claimed in claim 1, wherein the smart energy manager utilizes a wire communication protocol or a wireless communication protocol to collect and record the power qualities of the DC bus and the AC bus, and wherein the smart energy manager adjusts and controls the operation of at least one of the first fuel cell group, the first converter, the second converter, the third converter, and the secondary battery according to the recorded result.

* * * * *